Sept. 26, 1961     J. P. FOSNESS     3,001,742
CATAPULTED AIRCRAFT
Filed May 1, 1958                               2 Sheets-Sheet 1
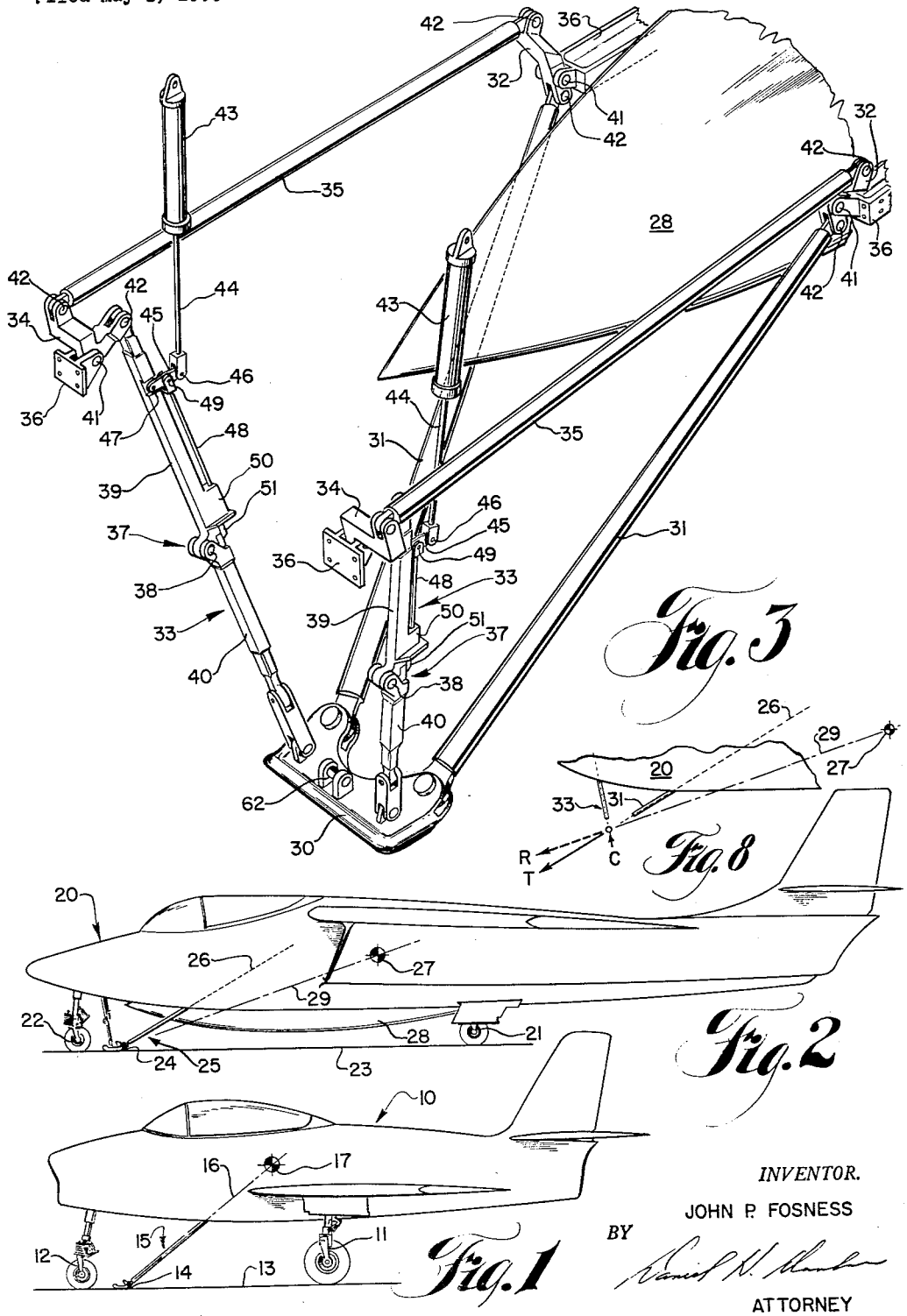
INVENTOR.
JOHN P. FOSNESS
BY
ATTORNEY Sept. 26, 1961 J. P. FOSNESS 3,001,742
CATAPULTED AIRCRAFT
Filed May 1, 1958 2 Sheets-Sheet 2

INVENTOR.
JOHN P. FOSNESS
BY
ATTORNEY

United States Patent Office 3,001,742
Patented Sept. 26, 1961

3,001,742
CATAPULTED AIRCRAFT
John P. Fosness, Columbus, Ohio, assignor to North American Aviation, Inc.
Filed May 1, 1958, Ser. No. 732,309
14 Claims. (Cl. 244—63)

This invention pertains generally to aircraft and specifically relates to an improved aircraft provided with a novel catapult bridle linkage for use in connection with catapult launchings thereof.

With respect to catapulted aircraft, it is a preferred practice that the catapult bridle utilized therein be so positioned with respect to the airplane's structure and with respect to the catapulting device, that the line of action of the resultant catapulting force will be passed through the center of gravity of the airplane. Generally, aircraft external configurations have heretofore permitted utilization of a single-bar type of catapult bridle which may be positioned in a manner whereby its longitudinal axis is directed along the desired line of force application. However, numerous design situations are now recognized wherein catapult attachments of the conventional type will prove unacceptable. This is particularly true in relation to airplanes having a low external configuration and in relation to airplanes provided with belly-type fuel tanks, or provided with a centrally located underslung missile, or weapon pod, or the like.

To overcome catapult bridle positioning problems associated with aircraft falling within these latter categories, I have discovered a novel aircraft catapult bridle. Essentially, my invention utilizes a multi-bar catapult bridle linkage which is pivotally attached to structural components of an airplane, and which may be positioned in the airplane with a substantial degree of non-alignment as between the catapult point of connection, the airplane center of gravity, and the bridle link which transmits the principal catapulting force.

Accordingly, it is an object of my invention to provide an aircraft catapult bridle attachment which may be utilized in combination with airplanes having a low external configuration, or airplanes provided with an underslung fuel tank, or a fuselage-supported weapon pod, or the like, wherein it is not feasible to utilize a conventional single-bar type catapult attachment.

Another object of this invention is to provide an airplane having a catapult attachment linkage which is not adversely affected by undulating action of the airplane during catapult launching operations.

Another object of this invention is to provide an airplane catapult bridle which may be positioned with respect to a catapult shuttle in a manner whereby contact may be made therewith even though the position of the airplane fuselage with respect to the launching deck may change substantially due to altered airplane loadings and the like.

Another object of this invention is to provide a bridle attachment which may be attached to aircraft without requiring appreciable strengthening of fuselage structural components.

A still further object of this invention is to provide an aircraft catapult bridle linkage which may be readily stowed within the confines of an associated aircraft fuselage during periods of non-use.

Another object of this invention is to provide an improved catapult bridle which has minimum weight requirements, which is not complex, which may be readily fabricated and easily maintained in an operable condition, and which has a high degree of operational reliability.

Other objects and advantages of this invention will become apparent during consideration of the drawings and detailed description.

In the drawings, wherein like reference numerals are used to designate like components throughout the same:

FIG. 1 is an elevational view of an airplane illustrating a conventional catapult bridle in combination therewith;

FIG. 2 is an elevational view of an airplane having a different exterior configuration, and having the catapult bridle of this invention utilized therewith;

FIG. 3 is a perspective view of a preferred form of an aircraft catapult bridle as used in this invention;

FIG. 8 is a force vector diagram for the catapult bridle of this invention.

Figure 4:
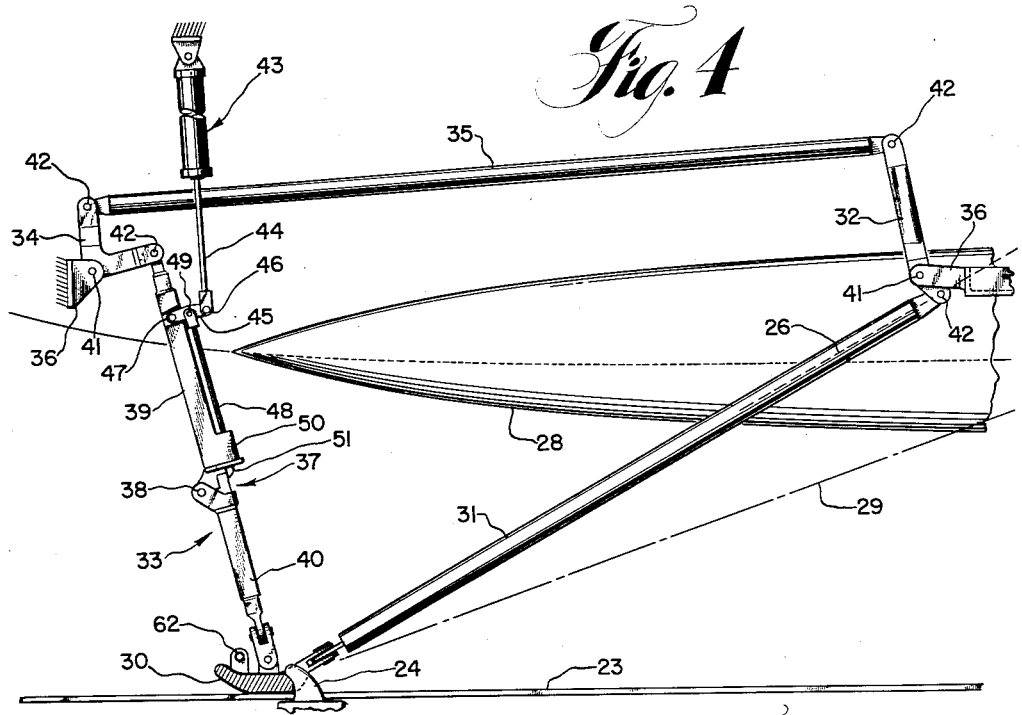
FIGS. 4 and 5 are side elevational views of the bridle of FIG. 3 showing the unit in its fully extended and fully retracted positions, respectively.

In FIG. 1 the airplane 10 is illustrated as having its main landing gear 11 and its nose landing gear 12 in contact with launching deck 13. Shuttle 14 of a typical catapult (not shown) projects through deck 13 and is pivotally connected to one end of a conventional single-bar bridle 15. The other end of bridle 15 is generally pivotally connected to fuselage structure of airplane 10. It is also to be noted in the conventional arrangement of FIG. 1, that the line of action 16 of the resultant of the catapulting forces transmitted from shuttle 14 into airplane 10 passes through an axis 17 of the center of gravity of the airplane.

The arrangement of FIG. 2 illustrates an airplane 20 having an external configuration which is substantially different from that of airplane 10 in FIG. 1. Airplane 20 is shown as having its main landing gear 21 and nose landing gear 22 provided in contact with a launching deck 23. Again, a catapult shuttle 24 projects through deck 23 and is connected to the catapult bridle of this invention, designated generally by the numeral 25.

The longitudinal axis of the principal thrust transmitting link of bridle 25 is along the line 26, and it is to be noted that line 26 does not pass through, or near, the center of gravity designated 27. With the catapult bridle of this invention, an arrangement may be effected whereby the line of action 29 of the resultant of the forces transmitted from shuttle 24 into airplane 20 may be made to pass through center of gravity 27 even though a weapon pod 28, which would prevent utilization of a conventional bridle attachment, is attached to the underside of the vehicle.

The basic bridle linkage utilized in the practice of this invention is illustrated in FIG. 3 as being comprised of a primary load link 31 which is pivotally attached at one extreme to shoe 30 and at the other extreme to bellcrank 32, a secondary load link 33 which is pivotally connected at one extreme to shoe 30 and at the other extreme to bellcrank 34, and connecting link 35 which is pivotally attached at its opposite ends to an arm portion of each of the previously mentioned bellcranks 32 and 34. Bellcranks 32 and 34 are in turn pivotally supported by the pivot blocks 36 which are directly associated with the airframe of an airplane and made a part thereof. Secondary load link 33 may be preferably provided with a fold joint 37 and a pivot 38 intermediate the upper portion 39 thereof and the lower portion 40 thereof. The reference numerals 41 designate the pivot points as between bellcranks 32 and 34 and the structural supports 36, whereas the reference numerals 42 indicate the points of pivot connection between various of links 31, 33, and 35 with the arms of each related bellcrank. If desired, spherical-type pivots may be utilized in the practice of this invention.

The embodiment of FIG. 3 utilizes two identical bridle linkages each attached to shoe 30 and to the airplane 20. This particular embodiment is preferred with respect to catapult launching operations wherein swaying of the catapulted airplane is contemplated. This embodiment is also preferred with respect to those applications wherein a store or weapon pod such as 28 is mounted on the underside of the airplane to thus require that the bridle assembly 25 straddle portions of that component. However, it is recognized that in certain applications, use of a single linkage in combination with a modified form of shoe 30 might be preferred.

Figure 5:
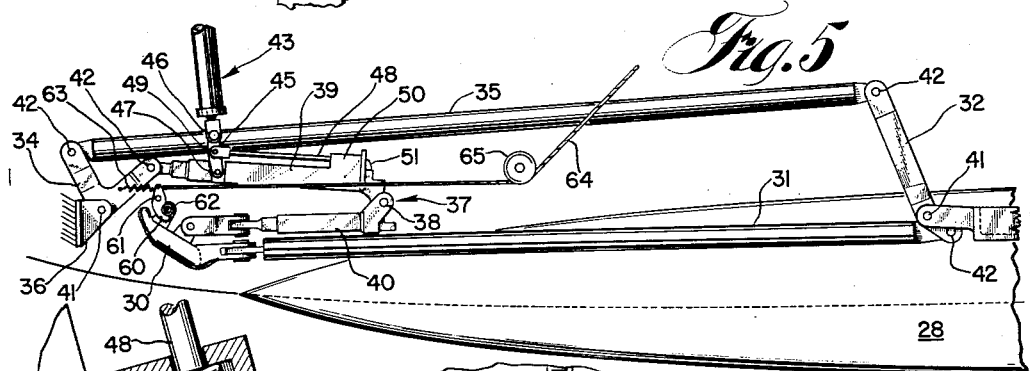
Figures 6, 7:
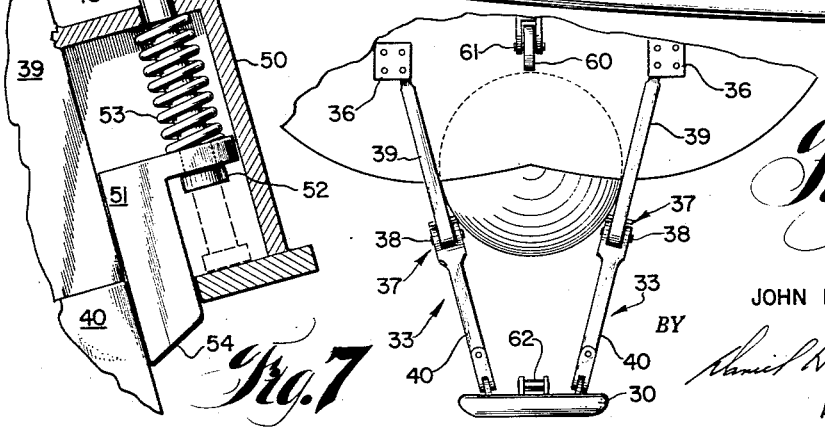
FIG. 6 is a front elevational view of the catapult bridle shown in FIG. 3.
FIG. 7 is a partial sectional view showing details of a joint locking arrangement which may be utilized in the practice of this invention.

The elevational illustration of FIG. 4 discloses use of an actuator 43 to withdraw bridle 25 to the position shown in FIG. 5. The rod portion 44 of actuator 43 is connected to a fold joint locking arrangement through lever arm 45. Arm 45 is pivotally attached to rod 44 at pivot 46, and to the upper portion 39 of link 33 at pivot point 47. A rod 48 is attached to lever 45 at pivot point 49 and projects through housing 50 (FIG. 7) to make engagement with lock bar 51. As illustrated in FIG. 7, lock bar 51 of the fold lock arrangement cooperates with the shoulder 52 provided on rod 48 and is maintained in an extended position by spring 53 which is located about rod 48 and intermediate shoulder 52 and housing 50. A sloping surface 54 is provided on bar 51 for cooperation with link portion 40.

A latching arrangement is shown schematically in FIG. 5 as being comprised of a latch 60 which is pivotally supported to a structural component of the airplane as at 61. The hook portion of latch 60 cooperates with spring 63 and with cable 64. Cable 64 may be passed over pulley 65 and connected to some interior portion of the airplane for manual operation. The withdrawal actuator, fold lock, and latching arrangements disclosed hereby are intended only as examples; their detailed construction is believed known to those familiar with aircraft arts.

It should be pointed out that primary link 31 is in tension when transmitting thrust forces from the catapult shuttle 24 to airplane 20. Secondary link 33 is in compression during its utilization in catapult launchings. Inasmuch as secondary link 33 is a compression component, it is only necessary that proper bearing surfaces be provided as between the abutting end portions of components 39 and 40 of that link. The pivot pin 38 and the locking bar 51 are not loaded to an excessive degree by side-wise forces. Also, because bellcrank 34 and link 33 are designed to be moved relative to the airframe, it is necessary that actuator rod 44 be free to move axially in either of two directions during utilization of this invention in a catapult launching.

When the bridle of this invention is utilized, as in the position of FIGS. 2, 3, and 4, thrust forces are transmitted into airplane 20 generally along the line 26, which corresponds to the axis of primary link 31, and generally along a line which corresponds to the axis of secondary link 33. As before pointed out, in a typical application line 26 will not pass through the center of gravity of the airplane 20. However, the forces applied to link 31 tend to cause bellcrank 32 to pivot about point 41 of its pivot block 36 in a clockwise direction. This in turn tends to cause connecting rod 35 to rotate bellcrank 34 clockwise about its axis of rotation. Rotation of bellcrank 34 in this direction causes compression of secondary load link 33 and introduces a reactive component into the aircraft's airframe at the pivot block 36 associated with bellcrank 34.

By a proper proportioning of each bridle link and each bellcrank arm, the reaction force may be controlled in magnitude to cause the resultant launching force to pass through the center of gravity of the airplane. Referring to FIG. 8, the tension force T is transmitted to the airplane from the catapult device 24 along the axis of component 31, and the reaction or compression force C is transmitted to the airplane 20 from the catapult device 24 along the axis of compression link 33. As indicated in the vector diagram, the resultant force R obtained by the vector addition of forces T and C is directed along a line 29 and through the center of gravity 27 of the airplane. Thus the launching forces applied to the airplane are caused to pass through the center of gravity even though the principal catapulting force is transmitted into structural components of the airplane along a line which does not closely approach the ship's center of gravity.

From the foregoing detailed description it is to be noted that an airplane having an unusually low configuration or carrying appended stores often cannot use a conventional single-bar bridle but can advantageously utilize the bridle attachment of this invention. Even though the positioning of the primary load link is such that the catapult thrust force transmitted therethrough is not directed to the center of gravity of the airplane, the desired result is obtained by introducing into the structure a compensating reaction force from the secondary link which alters the line of action to cause it to pass in the desired direction.

The invention described herein also may be utilized advantageously in those situations wherein the relative positioning of the airplane with respect to the launching deck is changed because of unusual or abnormal loading conditions. This feature is facilitated through the use of a linkage which is pivotable at each of its connection points.

It is to be understood that the forms of the invention herewith shown and described are to be taken as preferred embodiments of the same, but that various changes in the shape, size, and arrangement of parts may be resorted to without departing from the spirit of the invention or the scope of the subjoined claims.

I claim:

1. An airplane having an airframe, a center of gravity, and a catapult bridle attached to said airframe for transmitting a resultant launching force comprised of a catapult force and a reaction force to said airplane along a line passing substantially through said center of gravity, said catapult bridle including a first member attached to said airframe for transmitting said catapult force thereto, a second member attached to said airframe for transmitting said reaction force thereto, and means connecting said second member to said first member for causing said catapult force to induce said reaction force.

2. An airplane having an airframe, a center of gravity, and a catapult bridle attached to said airframe at separated points for transmitting a launching force comprised of a tension force and a compression force to said airplane along a line passing approximately through said center of gravity, said catapult bridle comprising a first link pivotally attached to said airframe for transmitting said tension force thereto, a second link pivotally attached to said airframe for transmitting said compression force thereto, and means movably connecting said second link to said first link for causing said tension force to establish said compression force.

3. The airplane defined in claim 2, wherein said catapult bridle is provided with attachment means for attaching said catapult bridle to a catapult device, wherein said first and second links are pivotally connected to said attachment means, and wherein said tension and compression forces are applied to said catapult bridle through said attachment means.

4. The airplane defined in claim 2, wherein said first link is attached to said airframe at a point substantially forward of said center of gravity, and wherein said second link is attached to said airframe at a point forward of the connection of said first link to said airframe.

5. The airplane defined in claim 2, wherein said catapult bridle second link is comprised of an upper portion and a lower portion, wherein said upper portion is pivotally connected to said lower portion, and wherein said upper and lower portions are rotatable relative to each other.

6. An airplane having an airframe, a center of gravity, and a catapult bridle attached to said airframe for transmitting a resultant launching force comprised of a catapult force and a reaction force to said airplane along a line passing substantially through said center of gravity, said catapult bridle including a pair of bellcrank members rotatably attached to said airframe at separate points, a primary load link pivotally attached to one of said bellcrank members for transmitting said catapult force to said airframe, a secondary load link pivotally attached to the other of said bellcrank members for transmitting said reaction force to said airframe, and separate link means pivotally connecting said bellcrank members to each other, said primary load link inducing said reaction force in said secondary load link through said separate link means.

7. The airplane defined in claim 6, wherein there is provided attachment means for attaching said catapult bridle to a catapult device, wherein said primary and secondary load links are pivotally connected to said attachment means, and wherein said catapult and reaction forces are applied to said catapult bridle at said attachment means.

8. The airplane defined in claim 6, wherein one of said bellcrank members is connected to said airframe at a point substantially forward of said center of gravity, and wherein the other of said bellcrank members is connected to said airframe at a point forward of the connection of said one bellcrank member to said airframe.

9. The airplane defined in claim 6, wherein the effective lengths of said primary load link, secondary load link, bellcrank members, and separate link means are proportioned to transmit said launching force along said line passing through said center of gravity when said primary and secondary load links are moved with respect to said airframe.

10. The airplane defined in claim 6, wherein said catapult bridle secondary load link is comprised of an upper portion and a lower portion, wherein said upper portion is pivotally connected to said lower portion, and wherein said upper and lower portions are rotatable relative to each other.

11. An airplane having an airframe, a center of gravity, and a catapult bridle attached to said airframe at separated points for transmitting a launching force comprised of a tension force and a compression force to said airplane along a line passing approximately through said center of gravity, said catapult bridle being comprised of a pair of multi-bar linkages connected to the airframe and arranged symmetrically with respect to the axis of said airplane, each said multi-bar linkage including a first link pivotally attached to said airframe for transmitting said tension force thereto, a second link pivotally attached to said airframe for transmitting said compression force thereto, and means movably connecting said second link to said first link for causing said tension force to establish said compression force.

12. An airplane having an airframe, a center of gravity, and a catapult bridle attached to said airframe for transmitting a resultant launching force comprised of a catapult force and a reaction force to said airplane along a line passing substantially through said center of gravity, said catapult bridle including a pair of multi-bar linkages attached to said airframe and arranged symmetrically with respect to the longitudinal axis of said airplane, each said multi-bar linkage including a pair of bellcrank members rotatably attached to said airframe at separate points, a primary load link pivotally attached to one of said bellcrank members for transmitting said catapult force to said airframe, a secondary load link pivotally attached to the other of said bellcrank members for transmitting said reaction force to said airframe, and separate link means pivotally connecting said bellcrank members to each other, said primary load link inducing said reaction force in said secondary load link through said separate link means.

13. An airplane having a catapult bridle attached to an airframe and comprised of a primary link for transmitting a tension force to said airframe along a line passing distantly from the center of gravity of said airplane, a secondary link for transmitting a reaction force to said airframe along a line passing distantly from said center of gravity, and movable means connecting said secondary link to said primary link for causing said tension force to induce said reaction force, said primary and secondary links and said movable means being proportioned so that the resultant force of said tension and reaction forces passes substantially through said center of gravity.

14. The airplane defined in claim 13 wherein said movable means includes a pair of bellcrank members connected to said airframe and a connecting link interconnecting said bellcrank members, one of said bellcrank members being connected to said primary link, and the other of said bellcrank members being connected to said secondary link.

References Cited in the file of this patent

UNITED STATES PATENTS

| | | |
|---|---|---|
| 2,523,314 | Maxson et al. | Sept. 26, 1950 |
| 2,735,391 | Buschers | Feb. 21, 1956 |
| 2,779,557 | Jakimiuk et al. | Jan. 29, 1957 |
| 2,954,946 | O'Neil | Oct. 4, 1960 |

FOREIGN PATENTS

| | | |
|---|---|---|
| 12,472 | France | July 5, 1910 |
| 854,089 | France | Jan. 2, 1940 |
| 756,056 | Great Britain | Aug. 29, 1956 |
| 771,726 | Great Britain | Apr. 3, 1957 |